(12) United States Patent
Köchl et al.

(10) Patent No.: US 12,030,146 B2
(45) Date of Patent: Jul. 9, 2024

(54) TRANSMISSION ARRANGEMENT AND METHOD FOR TRANSMITTING ENERGY AND SIGNALS BETWEEN A CONTROL UNIT OF A MACHINE TOOL AND ELECTRONIC COMPONENTS

(71) Applicant: DECKEL MAHO Pfronten GmbH, Pfronten (DE)

(72) Inventors: Roland Köchl, Pfronten (DE); Johannes Pitterle, Vils (AT)

(73) Assignee: DECKEL MAHO Pfronten GmbH, Pfronten (DE)

(*) Notice: Subject to any disclaimer, the term of this patent is extended or adjusted under 35 U.S.C. 154(b) by 241 days.

(21) Appl. No.: 17/627,828

(22) PCT Filed: Dec. 3, 2019

(86) PCT No.: PCT/EP2019/083488
§ 371 (c)(1),
(2) Date: Jan. 18, 2022

(87) PCT Pub. No.: WO2021/018408
PCT Pub. Date: Feb. 4, 2021

(65) Prior Publication Data
US 2022/0274220 A1  Sep. 1, 2022

(30) Foreign Application Priority Data
Jul. 31, 2019  (DE) .................. 10 2019 211 472.5

(51) Int. Cl.
*B23Q 15/007* (2006.01)
*H02J 50/10* (2016.01)
*G08C 19/00* (2006.01)

(52) U.S. Cl.
CPC ............ *B23Q 15/007* (2013.01); *H02J 50/10* (2016.02); *G08C 19/00* (2013.01)

(58) Field of Classification Search
CPC .................................................. B23Q 15/007
See application file for complete search history.

(56) References Cited

U.S. PATENT DOCUMENTS

2005/0078012 A1   4/2005   Bercher et al.

FOREIGN PATENT DOCUMENTS

DE   200 01 096 U1   5/2000
DE   100 59 193 C1   5/2002
(Continued)

OTHER PUBLICATIONS

EP-1522377-A1 English translation (Year: 2005).*
(Continued)

*Primary Examiner* — Jason L Vaughan
*Assistant Examiner* — Amanda Kreiling
(74) *Attorney, Agent, or Firm* — Henricks Slavin LLP

(57) ABSTRACT

A transmission arrangement for energy and/or signal transmission between a control unit of a machine tool and at least one electronic component, in particular for use in a machining center or a turning and/or milling center. The transmission arrangement is configured to transmit energy and/or signals between electronic components arranged on a pallet and a control unit of a machine tool. The method shows a procedure for automated machining of a workpiece by means of a machine tool, in particular when electronic components are arranged on a pallet on which the workpiece is clamped.

22 Claims, 10 Drawing Sheets

(56) References Cited

FOREIGN PATENT DOCUMENTS

| | | | |
|---|---|---|---|
| DE | 102005020703 A1 | 12/2005 | |
| DE | 102010013053 B3 | 9/2011 | |
| DE | 102010046952 B3 | 11/2011 | |
| DE | 202012009505 U1 | 11/2012 | |
| DE | 202013003108 U1 | 6/2013 | |
| DE | 102015121393 A1 | 6/2017 | |
| DE | 102009020509 A1 | 11/2020 | |
| EP | 0340681 A2 | 11/1989 | |
| EP | 1 522 377 A1 | 4/2005 | |
| EP | 1522377 A1 * | 4/2005 | ........... B23Q 1/0009 |
| EP | 3028804 B1 | 2/2017 | |
| FR | 2950276 A1 | 3/2011 | |
| JP | 2003-311573 A | 11/2003 | |
| JP | 2003311573 A * | 11/2003 | |
| JP | 2005-106079 A | 4/2005 | |
| JP | 2019-501784 A | 1/2019 | |

OTHER PUBLICATIONS

JP-2003311573-A English translation (Year: 2003).*
English translation JP2005106079 (Year: 2005).*
Examination Report dated May 12, 2020 for German App. Ser. No. 10 2019 211 472.5.
Office Action dated Nov. 29, 2023 for German App. Ser. No. 102019211472.5, with English language translation.
English language translation of Office Action dated Oct. 16, 2023 for Chinese App. Ser. No. 201980098906.2.
Office Action dated Apr. 12, 2023 for Chinese App. Ser. No. 201980098906.2 with English language translation.
International Search Report dated May 6, 2020 for PCT App. Ser. No. PCT/EP2019/083488.
English language translation of Office Action dated May 23, 2023 for Japanese App. Ser. No. 2022-506100.
Office Action dated Nov. 7, 2023 for Japanese App. Ser. No. 2022-506100, with English language translation.

* cited by examiner

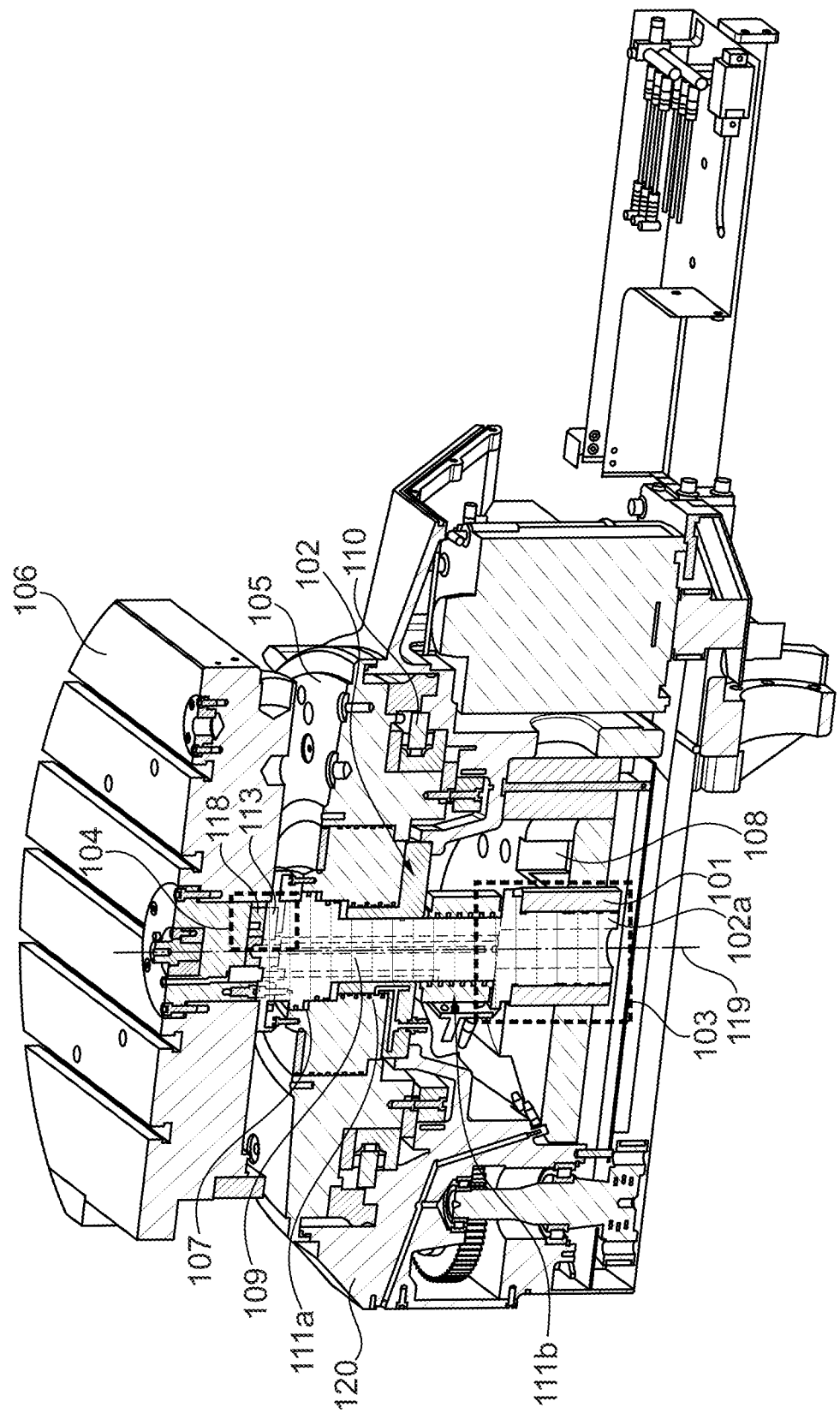

TRANSMISSION ARRANGEMENT AND METHOD FOR TRANSMITTING ENERGY AND SIGNALS BETWEEN A CONTROL UNIT OF A MACHINE TOOL AND ELECTRONIC COMPONENTS

TECHNICAL FIELD

The present invention relates to a transmission arrangement for energy and/or signal transmission between a machine tool and at least one electronic component, in particular for use in a machining center or a turning and/or milling center. The present invention also relates to a method for transmitting energy and/or at least one signal between a machine tool and at least one electronic component.

Technical Problem

When workpieces are machined using a machine tool, tools and workpieces are moved relative to one another in order to machine the workpiece. It is known from the prior art to transmit energy and/or signals in a contactless manner via a transmission arrangement to a clamping unit detachably fastened on a turntable of the machine tool, for driving an electric motor of the clamping unit. In particular, this is disclosed in EP 3 028 804 B1.

It is an object of the invention to provide an improved transmission arrangement for energy and/or signal transmission between a machine tool and at least one sensor and/or at least one actuator, in particular for use in a turning and/or milling center, or a method for transmitting energy and/or at least one signal between a machine tool and at least one sensor and/or at least one actuator.

Solution for the Problem

The object is achieved by the features of the independent claims. The dependent claims are directed to particular embodiments of the invention.

A transmission arrangement according to the invention for energy and/or signal transmission between a control unit of a machine tool and at least one electronic component, in particular for use in a machining center or a turning and/or milling center, may comprise a first and a second transmission unit.

Energy is preferably electrical energy. An electronic component may, for example, be an electrical load, a sensor and/or an actuator. In this sense, electronic components also include electrical components. Examples of sensors are temperature, angle, position and force sensors. These may include strain gauges, piezo sensors and thermocouples. Actuators are, for example, swing clamps, jaw chucks, magnetic clamps, vacuum clamps, shut-off flaps and valves. Actuators may be used to clamp a workpiece. An electrical load may be, for example, lighting, a control lamp, a heating element, etc.

By means of sensor monitoring, for example using force sensors, the clamping of a workpiece to be machined may be monitored and adjusted by means of the actuators. Shut-off flaps and valves may be used, for example, to control a coolant flow of a cooling unit arranged on the workpiece or to control a hydraulic unit. Control lamps may be used to transmit information on the functionality of sensors and actuators to a machine operator in a simple fashion.

A signal may include, for example, an optical signal and/or an electrical signal. A signal may be modulated. As a result, the susceptibility of the information transmitted by means of the signal to disturbances, for example due to interference signals or noise, may be reduced. Depending on the implementation, a signal may contain analog and/or digitized information.

In some embodiments, a plurality of signals may also be transmitted in parallel, for example via a plurality of ports or using different frequencies of the individual signals. In some applications, a plurality of pieces of information from different signals may be combined into one signal by means of modulation. Non-restrictive examples of modulations are amplitude, frequency and phase modulation, in particular phase shift keying (PSK) and quadrature amplitude modulation (QAM).

The transmission arrangement may further comprise a first and a second element, wherein the second element is mounted rotatably relative to the first element, wherein the first element is connected to the control unit for signal and/or energy transmission. Non-restrictive examples of rotatable mounting are slide bearings, roller bearings, tapered roller bearings and ball bearings. For this purpose, the pallet receptacle may be mounted rotatably relative to the carrier of the pallet receptacle, for example.

Furthermore, the first transmission unit may be configured to transmit signals and/or energy between the first element and the second element.

Both the first element and the second element may consist of one or more components so that the first or the second element is an assembly.

The first element and the second element may be connected to one another via a bearing. This may have the advantage that a deviation of the rotational axis during a rotation of the second element relative to the first element is reduced. The first transmission unit may consist of one or more, possibly also functionally different, transmitters.

The machine tool may be configured to rotate the pallet receptacle continuously at a predetermined speed and/or may be configured to change an orientation of the pallet receptacle and thus of the pallet and the workpiece by rotating the pallet receptacle.

Depending on the embodiment, the first transmission unit comprises one or more contactless and/or contact-based transmitters. Examples of contactless transmitters are inductive couplers, capacitive couplers, light wave couplers, etc. An example of a contact-based transmitter is a slip ring.

Both contact-based transmitters and non-contact transmitters may be arranged in such a way that energy and/or signals are transmitted in the radial direction or in the axial direction between the first element and the second element. Both in the case of a transmission in the radial direction and in the case of a transmission in the axial direction, a transmitter may be arranged outside a rotational axis defined by a relative rotation between the first element and the second element. When arranging and dimensioning a transmitter, however, it should be noted that it may be advantageous that an energy and/or signal transmission is guaranteed for every angle of rotation between the first element and the second element in order to be able to guarantee signal and/or energy transmission at any positioning.

In some embodiments, the second transmission unit may be configured to transmit signals and/or energy between the second element and a pallet detachably fastened to a pallet receptacle of the machine tool. According to the invention, the at least one electronic component for signal and/or energy transmission may be connected to the pallet.

Signals may thus include data such as sensor data and actuator data, which, in particular during rotary machining of a workpiece clamped on the pallet by means of a clamping device, are transmitted between a pallet, a clamping device or a workpiece and a control of a machine tool. This may make it possible to collect additional sensor data and, based on the sensor data and/or further sensor data, to control actuators during workpiece machining. Accordingly, workpiece machining may be better monitored and controlled. This results in increased safety during workpiece machining, and workpiece machining may be performed with increased accuracy.

Non-restrictive examples of actuators arranged on a pallet may be clamping devices such as swing clamps/support elements, vices, zero point clamping systems, magnetic clamps and/or vacuum clamps, HYD jaw chucks and/r E jaw chucks. All actuators may also contain sensors, in particular force, position, and temperature sensors.

The pallet receptacle may comprise a clamping device enabling reproducible, positionally precise and automated clamping of a pallet to be. A corresponding clamping device may comprise clamping cones, for example.

A pallet may be a workpiece carrier configured to be clamped on a pallet receptacle of a machine tool in a reproducible, positionally precise and automated manner. The machine tool may comprise a pallet changer for changing a pallet.

The second transmission device may comprise one or more contactless and/or contact-based transmitters. Non-restrictive examples of contactless transmitters are inductive couplers, capacitive couplers, light wave couplers, etc. Examples of contactless transmitters are plug-in connections and pressure contacts such as spring contacts.

This has the advantage that a workpiece clamped on the pallet may be exchanged quickly and efficiently by changing the pallet and, during workpiece machining, properties of the workpiece, for example a relative position of a workpiece to the machine tool table, a temperature of the workpiece, a deformation of the workpiece and a clamping path and/or a clamping force of clamping jaws, etc., may be detected, in particular in the case of rotary workpiece machining. Based on these sensor data and/or further sensor data, the workpiece machining may be modified by means of the transmission arrangement, for example by means of actuators such as clamping jaws arranged on the pallet. Therefore, machine tool productivity can be increased or work safety can be improved when machining a workpiece.

In addition, there is the advantage that automatically and, independently of the clamping of the workpiece, workpieces can be clamped by means of a pallet in the work area of the machine tool, sensor data can be sensed by sensors on the pallet and actuators on the pallet can be controlled. As a result, a machine tool can be used more flexibly and with less manual intervention. In addition, it is possible to optimize a clamping of a workpiece on a pallet by means of the sensors and actuators, in particular by means of force sensors and clamping devices, and thus to increase the reliability of clamped workpiece machining. A corresponding optimization may in particular also be performed even during workpiece machining and/or between machining steps. In addition, in some embodiments, the clamping of a pallet on a pallet receptacle may be monitored, for example by means of force sensors arranged between a clamping device of the pallet receptacle and the pallet.

A transmission arrangement according to the invention for energy and/or signal transmission between a control unit of a machine tool and at least one electronic component, in particular for use in a machining center or a turning and/or milling center, may comprise a first and a second transmission unit and a first element and a second element, wherein the second element may be rotatably mounted relative to the first element, wherein the first element for signal and/or energy transmission is connected to the control unit, wherein the first transmission unit may be configured to transmit signals and/or energy between the first element and the second element, and wherein the transmission arrangement may be configured to establish a releasable connection of the second transmission unit for energy and/or signal transmission between the second element and at least one electronic component by means of a docking stroke of the transmission arrangement.

In some embodiments, an interface, which is adapted to an interface of the second element for establishing a releasable connection, may be arranged on the side of the at least one electronic component. In some embodiments, the releasable connection may be a releasable contact, for example via contact springs, a plug connection, a plug connection with spring contacts, etc.

This may have the advantage that, when a clamping unit or a workpiece is placed on the machine tool table, no deformation, for example of the contact surfaces of a spring contact, is possible due to a relative radial movement between the machine tool table and the clamping unit or the workpiece. In this way, regardless of manual or automated clamping of a workpiece on the machine tool, contact surfaces of the second transmission unit can be protected.

The docking stroke is preferably carried out relative to the machine tool table. This may be advantageous in order to make the docking of the transmission arrangement to the clamping unit or the workpiece more positionally precise and more reproducible with respect to the docking position.

In some embodiments, the docking stroke may be carried out by means of a servomotor. The servomotor may, for example, be configured to generate a force action in an axial direction between the transmission arrangement and the machine tool table via one or more gears so that the transmission arrangement moves relative to the machine tool table in order to establish a separable connection for signal and/or energy transmission. In some embodiments, for example, an optimal spring force of the spring contacts may be determined in conjunction with force sensors, on the one hand to protect the spring contacts and on the other hand to ensure reliable transmission.

However, the invention is in no way limited to servomotors for performing the docking stroke. Alternatives are, for example, hydraulic or pneumatic drives. In some application examples, the docking stroke may be performed by means of magnetic attraction or magnetic repulsion.

A transmission arrangement according to the invention for energy and/or signal transmission between a control unit of a machine tool and at least one electronic component, in particular for use in a machining center or a turning and/or milling center, may comprise a first and a second transmission unit, a first element and a second element, wherein the second element is rotatably mounted relative to the first element, wherein the first element is connected to the control unit for signal and/or energy transmission, wherein the first transmission unit is configured to transmit signals and/or energy between the first element and the second element, wherein the transmission arrangement may be configured to establish a releasable connection of the second transmission unit for energy and/or signal transmission between the second element and a pallet detachably fastened to a pallet receptacle of the machine tool by means of a docking stroke of the transmission arrangement. According to the invention, the at least one electronic component for signal and/or energy transmission may be connected to the pallet.

This may have the advantage that pallets are exchanged particularly gently with regard to the influence of forces on components of the second transmission unit. The service life of the transmission arrangement can thus be increased.

In an advantageous embodiment, the at least one electronic component may be fixedly or detachably connected to the pallet. An actuator fixedly connected to the pallet may have the advantage that the structural stability of the connection between the actuator and the pallet is improved. A sensor that can be detached from the pallet may have the advantage that the sensor can be used flexibly. Wiring work for the electronic components may be minimized, for example, by appropriately configuring a pallet.

In an advantageous embodiment, the first transmission unit may be configured to transmit at least one signal and/or energy in a contactless manner. This may have the advantage that wear due to slip ring transmissions, for example, and thus unwanted disturbances due to, for example, the contact surface deteriorating in quality or becoming smaller in terms of area due to wear, can be avoided. Contactless transmission of the signals may be advantageous, in particular in the case of higher-frequency signals, in order to avoid unwanted signal reflections caused by a change in line impedance due to material removal from sliding contacts.

In an advantageous embodiment, the first transmission unit may comprise a slip ring transmitter for energy transmission including an integrated inductive coupler for signal transmission. This may have the advantage that coupling losses of contactless energy transmission of the first transmission unit can be avoided and low-power signals can be transmitted in a fail-proof manner. In addition, the expense of contactless energy transmission for minimizing coupling losses can be avoided. Particularly due to the compact arrangement, a slip ring transmitter including an integrated inductive coupler may be particularly advantageous.

In a particularly advantageous and robust embodiment, the first element may be supported in the radial direction by means of at least one torque support. The first element may be supported by a torque support, in particular in the radial direction. A torque support may, for example, be arranged via a tongue and groove connection on a first element along an axis defined by the docking stroke. As a result, a docking stroke of the transmission arrangement including the first element is possible, for example, while the first element is fixed in the radial direction. In addition, the torque support prevents the first element from co-rotating with the second element.

In further advantageous embodiments, the transmission arrangement may comprise at least one rotary leadthrough as a sealed passage between a hydraulic fluid supply, a gas supply or a vacuum supply and the second element for gases and/or liquids. Examples of gases are protective gases or air. In some embodiments, the second transmission device may be configured to transmit one or more fluids (gases, liquids) between the second element and the pallet, the machine tool table, etc.

For this purpose, the second transmission device may comprise interfaces configured to form a plug-in connection and/or coupling. This may be particularly advantageous for vacuum clamping of a workpiece on a machine tool table or on a pallet. Examples of fluids may be coolants, lubricants and hydraulic fluids. In order to improve the cooling, it may be advantageous to supply the workpiece with coolant. In order to reduce the need for lubricant, it may be advantageous to dispense lubricant as precisely as possible via nozzles attached to the workpiece, the pallet or the tool table. The first transmission unit and the second transmission unit may be connected to one another, for example, via a channel in the rotary leadthrough, in particular by means of one or more cables.

In a particularly advantageous embodiment, the second transmission unit may be configured to transmit at least one signal and/or energy in a contactless manner, in particular by means of an inductive coupler, and/or in a contact-based manner, in particular by means of a spring contact. Using contact-based transmission, such as with spring contacts, for example, a large amount of energy can be transmitted with little effort with the lowest possible losses in comparison to contactless transmission. Spring contacts, in particular, may be advantageous for fast contact cycles (plug-in cycles) that have to be released frequently. Plug-in connectors as contact-based transmitters may have the advantage that the contact surfaces are particularly well protected from dirt due to the sleeve of the sockets. In some implementations, plug-in connections with spring contacts may therefore be advantageous. Contact-based energy transmission may be particularly advantageous for the transmission of energy in the form of direct current.

With contactless transmission, the energy and signal transmission may be more robust with regard to interfering influences such as dirt particles and chip waste. This may be particularly advantageous when transmitting signals with low energy.

In an advantageous embodiment, the at least one electronic component may be arranged in a positionally fixed manner relative to the machine tool table, the pallet and/or the workpiece. As a result, workpiece properties, such as temperature, weight, etc., may be sensed during workpiece machining and, depending on the property, may be influenced by the actuators. In some embodiments, machining parameters, such as a spindle speed, may be modified as a function of workpiece properties, such as the workpiece temperature, in particular during workpiece machining. The workpiece properties may, for example, be sensed by means of the at least one electronic component. This may result in an improvement in the accuracy of workpiece machining.

In a particularly compact embodiment, a signal processing unit may be arranged on, in or at the machine tool table and/or the pallet, wherein the signal processing unit is connected to the at least one electronic component for signal and/or energy transmission, and wherein the signal processing unit is connected to the transmission arrangement for signal and/or energy transmission. The signal processing unit may be configured to communicate with the at least one electronic component and/or the control unit of the machine tool via one or more protocols or without a protocol.

The signal processing unit may be an analog and/or digital signal processing unit. In some embodiments, the signal processing unit may comprise a computing unit and/or a memory unit. The signal processing unit may be, for example, a microcontroller, an FPGA (Field Programmable Gate Array), an analog circuit unit, a system on chip (SoC), etc. A machine tool may be configured to retrieve data from a memory unit of the signal processing unit. A communication may also comprise a simple provision of a signal.

By attaching a signal processing unit to the machine tool table and/or to the pallet, signals from various sensors and/or actuators may be amplified, modulated, bundled, etc. before communication with a control unit of the machine tool. This may have the advantage that the signal quality is improved, the number of signal channels required is reduced, a larger amount of information, such as sensor settings, sensor states, etc. can be transmitted, etc. Moreover, depending on the signal processing unit, sensors and actuators can be exchanged without major cabling work.

In a particularly flexible embodiment, an SDCI interface ("Single-Drop Digital Communication Interface for Small Sensors and Actuators"), which corresponds to the IEC 61131 standard, may be connected to a pallet or a machine tool table and the at least one electronic component for signaling and/or energy transmission, wherein signals and/or energy is transmitted between the at least one electronic component and the control unit of the machine tool via the SDCI interface and the transmission arrangement. In some embodiments, the SDCI interface may be configured to bundle a plurality of signals into one signal or to transmit a plurality of pieces of information by means of one signal.

Automation in workpiece machining can thereby be increased since the electronic components may be configured directly on the side of a machine tool in a flexible manner, in particular when the electronic components are arranged on an exchangeable pallet. In addition, a machine tool may be used flexibly for the series production of various workpieces without electronic components being manually connected to a control unit and without sensors/actuators having to be reprogrammed manually. In addition, there may be the advantage that a pallet can be flexibly equipped with further electronic components without having to add or modify transmission units for communication with the new electronic components. As a result, a machine tool, particularly the transmission arrangement, and pallets can be used more flexibly.

In a particularly robust embodiment, at least the surface of the machine tool table or the pallet receptacle on a side directed towards the workpiece or on a side directed towards a pallet may include a recess or a cutout for at least part of the transmission arrangement. This may have the advantage that the transmission arrangement is protected from chips, dirt, etc. to a greater extent, in particular during workpiece machining.

In a further embodiment, the first transmission unit on the side of the first element may comprise a body with a cylindrical recess, and the first transmission unit on the side of the second element may comprise a cylindrical body at least partially arranged in the cylindrical recess of the body with the cylindrical recess of the first transmission unit.

This may have the advantage that the shielding against electromagnetic interference during signal transmission is improved. In some embodiments, both the cylindrical body and the body with a cylindrical recess may be rotationally symmetrical in order to avoid imbalances. In some embodiments, the cylindrical body may include a recess in the form of a cylinder along the rotationally symmetrical axis of the cylindrical body.

A pallet for carrying and fastening a workpiece according to the invention may be configured to be detachably clamped on a pallet receptacle of a machine tool. As a result, a workpiece may be clamped in the work area of the machine tool in an automated manner. A machine tool may be configured, for example, to machine the workpiece in a rotating and/or cutting manner.

According to the invention, the pallet may comprise an interface of the pallet configured for communication with an interface of a control unit of a machine tool, wherein at least one electronic component arranged on the pallet is connected to the interface of the pallet for signal and/or energy transmission. Electronic components may be sensors, actuators and/or electrical loads. By means of the interface of the pallet, sensors and actuators, for example, may be fixedly connected to the pallet even if the pallet is removed from the machine tool. This means that, for example, there is no need for a new calibration due to the fact that a sensor, for example a position sensor, is repeatedly remounted on the pallet. This results in time savings, which is very efficient, in particular, in case of an automated exchange of workpieces via pallets.

In some implementations, an actuator may include one or more sensors. A sensor may be integrated into the pallet, for example a strain gauge for detecting a clamping force between a clamping cone clamping the pallet and a corresponding counterpart of the pallet. Corresponding embodiments are also possible when the pallet is clamped by means of clamping jaws, etc.

In some implementations, an electronic component may be fixedly or detachably connected to the pallet.

One or more sensors may, for example, detect workpiece properties such as position, orientation, temperature, deformations, in particular due to the workpiece clamping, etc. Actuators may be configured, for example, to position, align, cool, etc. the workpiece.

In some implementations, the interface may comprise one or more analog circuits and/or one or more digital circuits. Interfaces may be wireless interfaces such as wireless LAN, Bluetooth, infrared, NFC (Near Field Communication), etc. Furthermore, interfaces may be line-based interfaces, such as wire connections, fiber optic connections. In particular, the line-based interfaces may include plug-in connections and/or spring contacts. The interface of the pallet may be configured to enable communication of the interface of the pallet with a plurality of electronic components and/or the control unit of the machine tool at the same time.

In some embodiments, the interface of the pallet may be configured to establish a connection for signal and/or energy transmission to the interface of the control unit of the machine tool via a transmission arrangement.

The interface of the pallet may be configured to communicate with electronic components and/or with a control unit of the machine tool via the at least one interface by means of a protocol. This has the advantage that data from and for electronic components may be collected and transmitted to and from the control unit. In addition, the transmission between the electronic components and the control unit of the machine tool can be used flexibly so that electronic components can be changed and/or additionally attached to the pallet without an additional connection having to be established between the pallet and the control of the machine tool.

In some embodiments, the interface of the pallet may be configured to communicate with electronic components and/or with a control unit of the machine tool without a protocol. This has the advantage that, for example, sensors and actuators that do not include an expensive analog/digital converter or digital/analog converter can also communicate with the control unit of the machine tool via the interface of the pallet. Also, the compatibility of the pallet with conventional electronic components and machine tools can be improved.

An interface arranged on the pallet has the particular advantage that information, in particular from sensors and actuators, can be exchanged between the pallet and a control unit of a machine tool via a channel. In particular, a number of interfaces for the transmission of signals generated by means of different electrical components for different workpieces to the control unit can also be reduced. In addition, in the case of a radio connection, for example, the data transmission can be improved by means of radio signals, since in particular any interference caused by adjacent channels can be reduced. In the case of wired transmission of data by means of signals between the pallet and the control unit, the number of lines or cables can be reduced and electronic components can be added more flexibly.

In some embodiments, the interface of the pallet may be an SDCI interface according to the IEC 61131 standard. This has the advantage that the communication between electronic components and the control of the machine tool is standardized so that electronic components can communicate with the control unit of the machine tool in a standardized manner and thereby in a simplified manner.

In some embodiments, the interface of the pallet may comprise a memory unit. In some embodiments, the memory unit may be configured to store information relating to the pallet, a workpiece on the pallet and/or electronic components.

A method according to the invention for transmitting energy and/or at least one signal between a machine tool and at least one electronic component may comprise the step of clamping the workpiece on a pallet comprising an interface for signal transmission and/or for energy transmission. The interface may be part of a contactless transmission, such as an inductive coupler, a capacitive coupler, an optocoupler, etc., and/or a contact-based transmission, such as a spring contact, a plug-in connection, etc., when, for example, a transmission arrangement is docked to the interface.

Further steps of the method may comprise positioning and clamping the pallet on a pallet receptacle of the machine tool, docking a transmission arrangement for transmitting energy and/or signals to the interface of the pallet, and transmitting at least one sensor signal, at least one actuator signal and/or energy via the docked transmission arrangement.

The transmission arrangement may be configured, for example, to transmit signals and/or energy between a first element and a second element, the first and the second element being configured to rotate relative to one another. Signals may be, for example, signals for communication between sensors/actuators or other electronic components with a control unit of the machine tool.

The docking of the transmission arrangement may already be carried out by positioning and clamping the pallet on the pallet receptacle, in that the transmission arrangement and the interface of the pallet are arranged relative to one another correspondingly by positioning and clamping the pallet.

By docking the transmission arrangement to the interface of the pallet, the transmission arrangement and the interface may be arranged with respect to one another in such a way that interference-free, contactless transmission between the transmission arrangement and the interface of the pallet is possible and/or at least one contact between the transmission arrangement and the interface of the pallet enables interference-free signal and/or energy transmission.

Alternatively, docking may comprise, for example, a docking stroke of the transmission arrangement. A docking stroke of the transmission arrangement may in particular be a movement of the transmission arrangement in the direction of the pallet. In some embodiments, the docking stroke is only a movement of a portion of the transmission assembly. In preferred embodiments, the movement of the docking stroke is perpendicular to the interface of the pallet. In some implementations, the docking stroke may comprise a movement parallel to the interface of the pallet.

This has the advantage that the machine tool is particularly flexible when machining, in particular when clamping, a workpiece. In this way, the workpiece may be clamped in the work area of the machine tool in an automated manner even if electronic components are arranged on the clamping device.

A particularly efficient method may comprise the further steps of undocking the transmission arrangement from the pallet, changing the pallet, clamping a further workpiece on a further pallet comprising an interface for signal transmission and/or energy transmission, positioning and clamping the further pallet on the pallet receptacle of the machine tool, docking the transmission arrangement for transmitting energy and/or signals to the interface of the further pallet, and transmitting at least one signal of an electronic component and/or energy via the docked transmission arrangement. This has the advantage that an automated inserting and removing of workpieces into and from a machine is possible and sensor data and/or actuator data from sensors or actuators can still be exchanged with a control unit of the machine tool during workpiece machining. In particular, this may increase safety since it is not necessary for electronic components to be manually connected to the control unit of the machine tool in the work area of the machine tool.

In a preferred embodiment of the method, the docking may be carried out via a docking stroke of at least a part of the transmission arrangement directed towards the pallet so that contact is established between the transmission arrangement and the interface of the pallet. This may have the advantage that the transmission arrangement, in particular when changing pallets, is protected from damage due to shear movements of the pallet when removing or positioning it from/on the machine tool table,

DESCRIPTION OF THE DRAWINGS

FIG. 1c shows FIG. 1a with the second element 102 being marked.

FIG. 1a schematically shows a cross section of a part of a machine tool comprising a transmission arrangement according to an embodiment of the invention. A portion of the first element 101 and a portion 102a of the second element 102 form a first transmission unit 103 for transmitting signals and/or energy, the second element 102 being mounted rotatably relative to the first element 101.

Figure 1A:
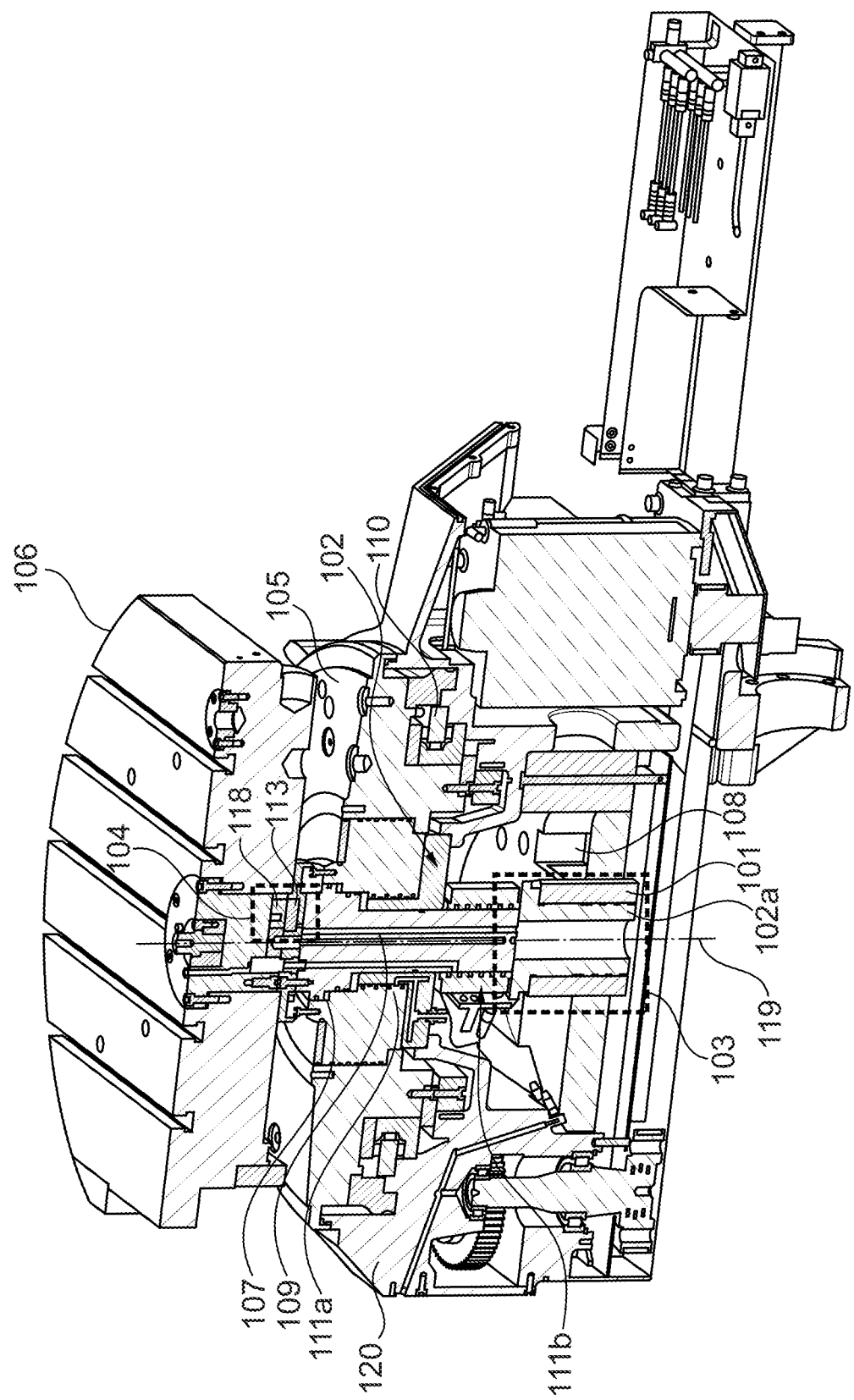
FIG. 1a schematically shows a cross section of a part of a machine tool comprising a transmission arrangement according to an embodiment of the invention.

In this embodiment, a rotary leadthrough 111b is arranged between the first element and the second transmission arrangement. In this embodiment, the second element comprises the portion of the rotary leadthrough 111b which is rotatable relative to the first element 101 about a rotational axis 119. The first transmission unit 103 is connected to a second transmission unit 104 via a channel in the rotary leadthrough 111b. Cables, wires, circuit boards, waveguides, etc. may be arranged in the channel in order to connect the first and second transmission units 103, 104 for energy and/or signal transmission, for example optically and/or electrically.

The second transmission unit 104 is configured to transmit signals and/or energy between the second element 102 and a pallet 106 and comprises an interface of the pallet 118 and an interface 113 of the second element 102. In this exemplary embodiment, the pallet is fastened to a pallet receptacle 105 of the machine tool by means of clamping cones 112. This can be seen in particular in FIG. 1d. In this embodiment, the pallet receptacle 105 is rotatably mounted in relation to a carrier 120 of the pallet receptacle 105, for example by means of a bearing 110. In this embodiment, the first element is connected to the carrier 120 of the pallet receptacle in the radial direction. In this embodiment, the second element 102 is connected to the pallet receptacle in the radial direction. This results in two bodies which can be rotated relative to one another about a rotational axis 119. The rotatable body is hatched horizontally in FIG. 1b.

In this embodiment, the transmission arrangement comprising the first and second elements 101, 102 was docked to the interface 118 of the pallet 106 by means of a docking stroke of the transmission arrangement relative to the pallet receptacle 105 so that an interference-free signal and/or energy transmission between the transmission arrangement and the pallet 106 is possible. In this embodiment, the docking stroke was carried out by means of a hydraulic unit 107. In further embodiments, the docking stroke may also be implemented by means of an electric motor, in particular a stepping motor. In addition, it is apparent in FIG. 1a that the rotary leadthrough 111b was moved with the docking stroke, whereas a rotary leadthrough 111a was not moved with the docking stroke. Fluids (gases and liquids) can be transferred between the carrier 120 of the pallet receptacle and the second element 102, which is rotatably mounted relative to the first element 101, via the rotary leadthrough 111b. For example, a vacuum clamping device on the pallet 106 may be actuated or a workpiece may be supplied with cooling liquid while the workpiece is being machined.

Fluids can be transferred between the pallet receptacle 105 and the carrier 120 of the pallet receptacle via the rotary leadthrough 111a. In this way, for example, clamping cones can be released by means of hydraulic pressure.

Both the first element and the second element may consist of a plurality of components so that the first element 101 or the second element 102 is an assembly.

Figure 1B:
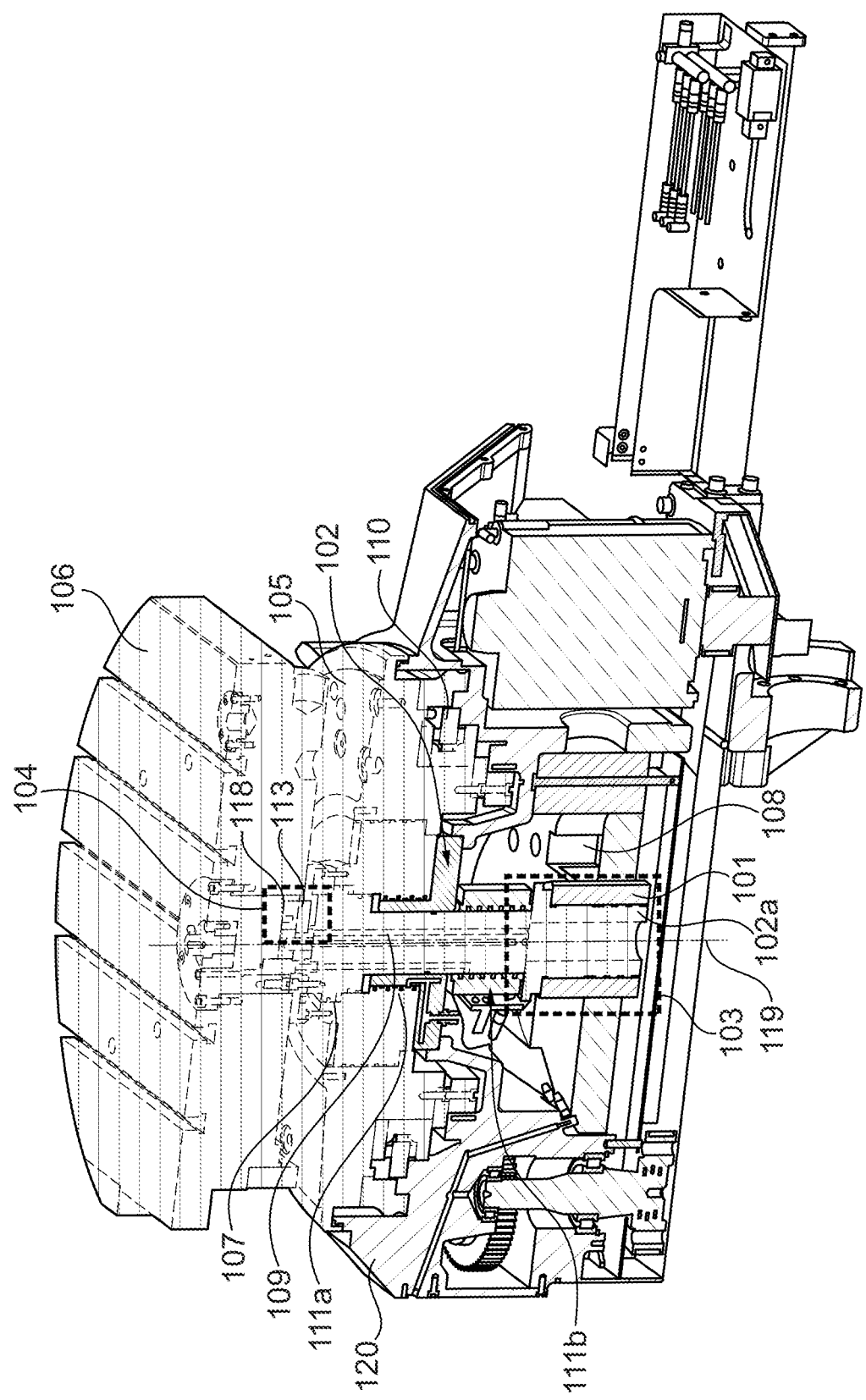
FIG. 1B shows FIG. 1a with elements rotatable about an axis of rotation being marked.

FIG. 1B shows FIG. 1a with components rotatable about a rotational axis 119 being marked. In this embodiment, components provided with horizontal hatching can be rotated about a rotational axis 119 relative to the carrier 120 of the pallet receptacle. Consequently, the pallet 106, the pallet receptacle 105, the second element 102, etc., inter alia, can be rotated relative to the carrier 120 of the pallet receptacle and the first element 101 about the rotational axis 119. A rotation may be carried out, for example, by means of a motor, in particular an electric motor. Electric motors may be synchronous or asynchronous motors, for example. Synchronous motors have the advantage that they are very well suited for exact positioning, which is particularly advantageous for NC technology. Asynchronous motors have the advantage that they can be temporarily overloaded.

FIG. 1c shows FIG. 1a with the second element 102 being marked. The second element is provided with horizontal dark hatching. When comparing FIGS. 1a and 1c, it is apparent that the second element in this embodiment comprises a plurality of components such as, inter alia, part of the rotary leadthrough 111b and the portion 102a of the second element.

Figure 1D:
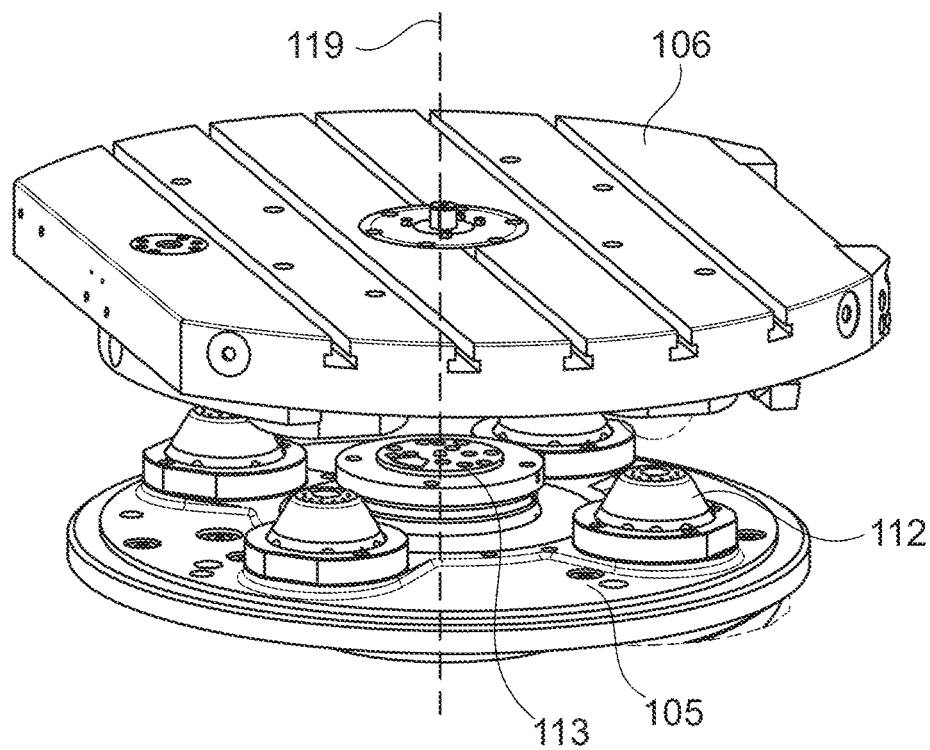
FIG. 1d schematically shows a pallet and a pallet receptacle, as well as part of the transmission arrangement according to an embodiment of the invention.

FIG. 1d schematically shows a pallet 106 and a pallet receptacle 105, as well as part of the transmission arrangement from FIG. 1a according to an embodiment of the invention. The pallet receptacle 105 comprises clamping cones 112. Thereby, a pallet can be clamped on the pallet receptacle 105 in an automated, reproducible and positionally fixed manner. The pallet 106 may be clamped on the pallet receptacle 105, for example, by means of clamping cones, as shown here. However, this is in no way restrictive. In alternative embodiments, a pallet 106 may be clamped onto the pallet receptacle 105 by means of clamping jaws, by means of vacuum clamps, by means of magnetic clamps, by means of zero-point clamping systems, etc., for example.

The interface 113 of the second element 102 is clearly apparent in FIG. 1d. This interface 113 and the interface 118 of the pallet 105 are components of the second transmission device 104, see in particular FIG. 1a, and are preferably docked to one another for signal and/or energy transmission. By carrying out the docking stroke of at least a part of the transfer arrangement, the part of the transfer arrangement including the interface 113 is moved towards the pallet 106 so that the interface 113 docks to the interface 118 of the pallet 106 when the pallet 106 is positioned and fixed on the pallet receptacle.

It is particularly apparent in FIG. 1d that the second transmission unit 104 comprising the interfaces 113, 118 may comprise a plurality of ports for signal and/or energy transmission. In some embodiments, the second transmission unit 104 comprises one or more ports for the transmission of fluids between the pallet 106 and the second element 102. In FIG. 1d, the transmission unit is configured to be centric with respect to the rotational axis 119. In some embodiments, the second transmission unit may be arranged eccentrically to the rotational axis 119. Furthermore, it is not necessary for the docking stroke to be parallel to the rotational axis 119. In some embodiments, the docking stroke may be carried out perpendicularly to the interfaces 113 and 118 of the second transmission device. In some embodiments, the interface 113 may be part of a clamping device of the pallet receptacle for clamping a pallet on the pallet receptacle.

Figure 1E:
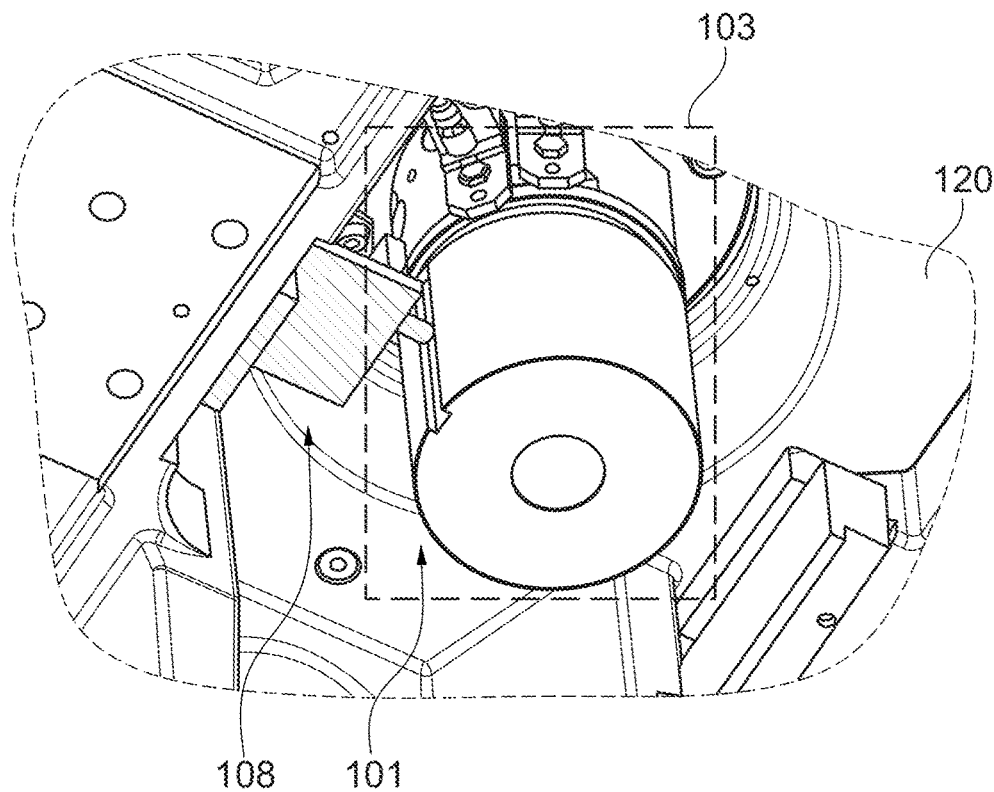
FIG. 1e schematically shows a first transmission unit 103 and a torque support 108 of the transmission arrangement from FIG. 1a according to an embodiment of the invention.

FIG. 1e schematically shows a first transmission device 103, as well as a torque support 108 of the transmission arrangement from FIG. 1a according to an embodiment of the invention in order to counteract a rotation of the first element 101 relative to the carrier of the pallet receptacle 120. The torque support 108 is hatched in black and white in FIG. 1e. In this embodiment, the first transmission device 103 comprises a cartridge-shaped housing. The cartridge-shaped housing may have a recess in the middle, in particular a cylindrical recess as shown in FIG. 1e.

In this embodiment, the first element 101 has an elongated recess (groove) on the outside parallel to the rotational axis 119, the elongated recess being configured to receive an end portion of a torque support 108. The torque support 108 is connected to the carrier 120 of the pallet receptacle 105. Thus, a movement of the first element 101 in a direction of rotation about the rotational axis 119 relative to the carrier 120 of the pallet receptacle 105 and a movement in a direction parallel to the rotational axis 119 (along the elongated recess) relative to the pallet receptacle 105, for example for a docking stroke of the transmission arrangement, are enabled.

In other embodiments, only a part of the first and/or second element 101; 102 may be configured to be moved in the direction of the pallet for carrying out the docking stroke. To this end, it may be necessary for connections between the first and second transmission units 103, 104 in the channel 109 of a rotary feedthrough to be able to compensate for a corresponding length expansion. In some embodiments, the docking stroke may be carried out in the radial direction, for example. In further embodiments, the docking stroke may be carried out perpendicularly to the interfaces 113 and/or 118, independently of a rotational axis. However, this is in no way restrictive.

In some embodiments, alternatively or additionally, a torque support may be arranged between the second element 102 and the pallet receptacle 105.

Figure 2:
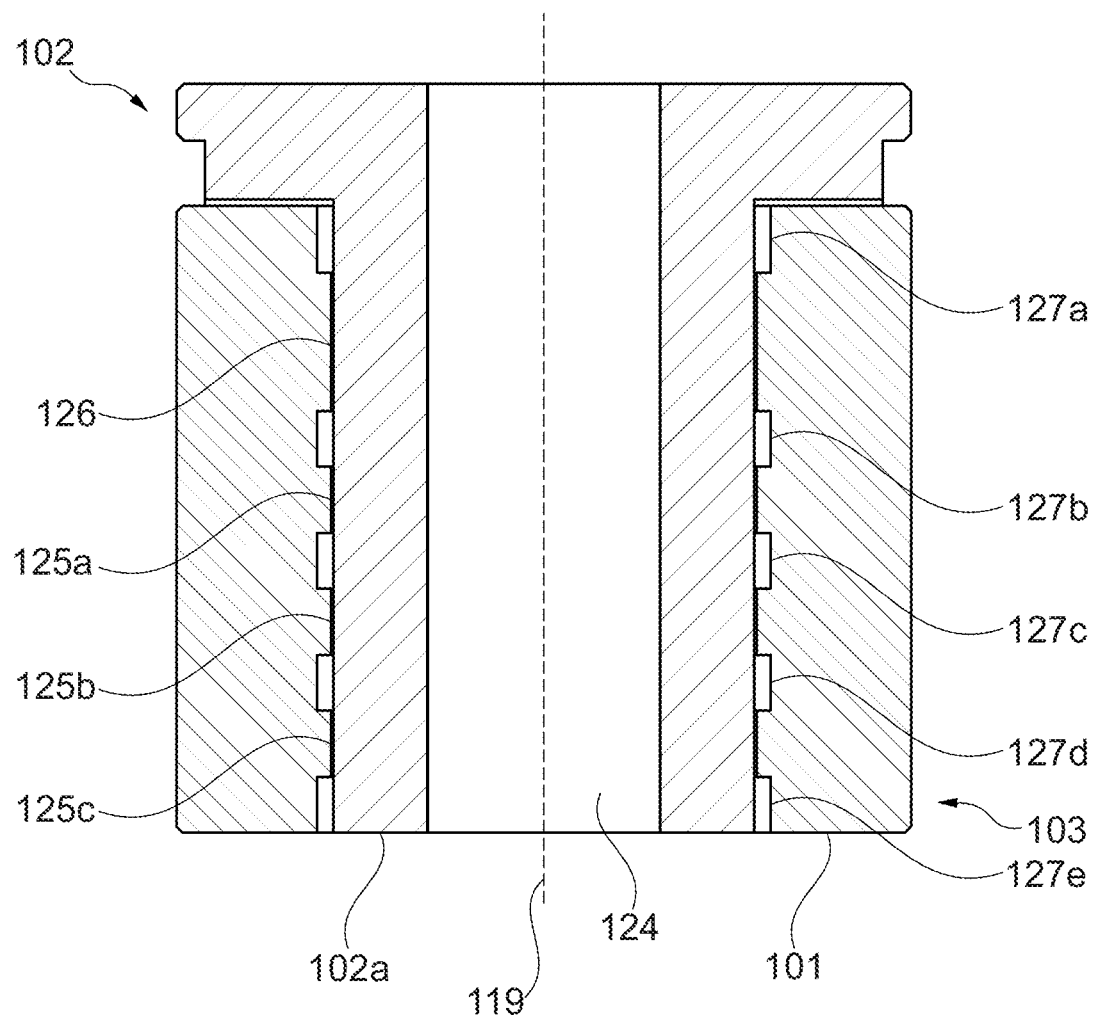
FIG. 2 schematically shows a cross section of a first transmission unit according to an embodiment of the invention.

FIG. 2 schematically shows a cross section of the first transmission unit according to an embodiment of the invention. In this embodiment, the first transmission unit 103 comprises three slip ring transmitters 125a-125c decoupled from one another and a contactless transmitter 126. The three slip ring transmitters 125a-125c may be configured, for example, to transmit a three-phase alternating current. In a further embodiment, the slip ring transmitter 125a may be an outer (phase) conductor, the slip ring transmitter 125b may be a neutral (mid-point) conductor and the slip ring transmitter 125c may be a protective conductor. Depending on the embodiment, the slip ring transmitters may be configured to transmit direct current or alternating current. The contactless transmitter 126 may be, for example, an inductive coupler or a capacitive coupler. The contactless transmitter 126 may be configured, for example, to transmit a broadband signal, that is to say a broad frequency spectrum compared to the center frequency, or a plurality of signals with different frequencies.

In some embodiments, at least one of the areas 127a-127e between the slip ring transmitters 125a-125c, as well as between the slip ring transmitter 125c and the contactless transmitter 126, may comprise an insulator and/or a shielding configured to prevent a short circuit between two transmitters or to prevent crosstalk between two transmitters. In some implementations, at least one of the areas 127a-127e may include a bearing. This may improve the transmission of signals and/or energy between the first element 101 and the second element 102, since imbalances can be avoided. In some embodiments, a transmitter 125a; 125b; 125c; 126 is rotationally symmetrical about the rotational axis rotational axis 119. In some embodiments, the diameter of one transmitter may differ from that of another transmitter.

In some embodiments, the second element 102 may be hollow inside, at least in places, or may have a recess 124. Advantageously, a cavity or the recess may be arranged in such a way that an imbalance during rotation of the second element 102 relative to the first element 101 is compensated for or avoided. A recess may be cylindrical.

Figure 3:
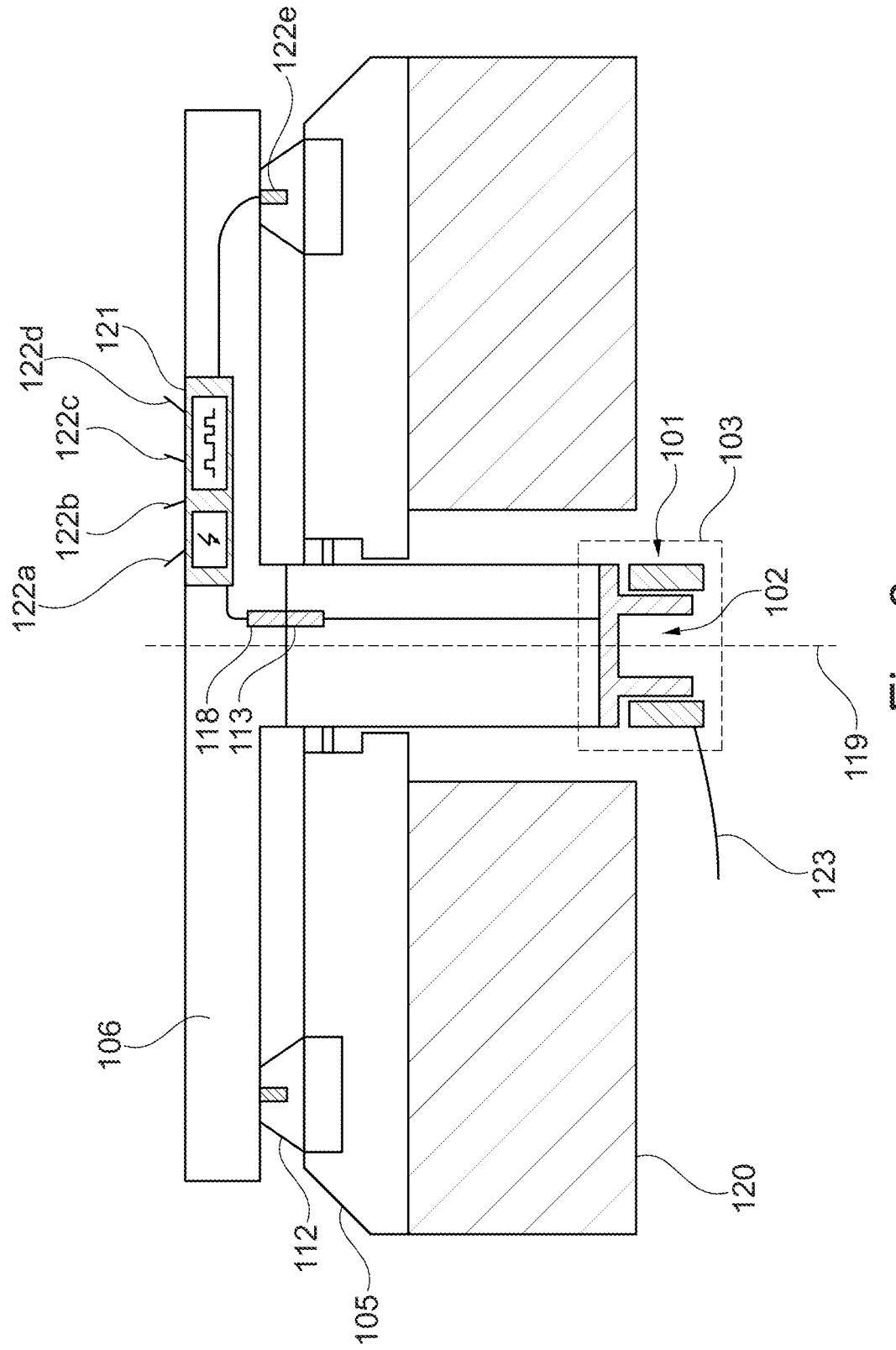
FIG. 3 schematically shows part of a machine tool comprising a transmission arrangement according to an embodiment of the invention.

FIG. 3 schematically shows part of a machine tool comprising a transmission arrangement according to an embodiment of the invention. A first transmission unit 103 is configured to transmit signals and/or energy between a first element 101 and a second element 102. The second element 102 is rotatable relative to the first element about a rotational axis 119. The second element includes an interface 113 which can be detachably docked to an interface 118 of the pallet 106. The interface 113 forms, with the interface of the pallet 118, a second transmission unit configured to transmit signals and/or energy between the second element and the pallet. The docking may be carried out, for example, via a docking stroke of the first element 101 and/or of the second element 102. The first element may, for example, be connected to a control unit of the machine tool and/or an energy source via a connection 123, such as one or more cables, radio, etc.

In some embodiments, the interface of the pallet 118 may include an SDCI interface that conforms to the IEC 61131 standard. In some embodiments, the SDCI interface may be integrated into the interface of the pallet 118 or they may be directly coupled to one another. In further embodiments, various components of the interface of the pallet on the pallet may be spatially distributed over the pallet, the components of the interface of the pallet being connected to one another via one or more connections for signal and/or energy transmission in a wired and/or contactless manner, for example via radio.

A pallet receptacle 105 is mounted on a carrier 120 of the pallet receptacle 105 so as to be rotatable about the rotational axis 119. The pallet receptacle 105 comprises clamping cones 112 configured to clamp the pallet 106 on the pallet receptacle in a detachable and automated manner. It is thus possible to transmit signals and energy between a pallet, which can be rotated as desired about the rotational axis 119 relative to a carrier of a pallet receptacle, and a control unit of the machine tool in a fail-proof manner. In this way, the advantages of a pallet, such as the quick insertion and removal of a workpiece in a machine tool, etc., may be combined with sensors on a clamping unit that clamps a workpiece.

In some embodiments, a pallet can include a signal processing unit 121, which may be configured, for example, to transform voltages, convert direct current into alternating current and vice versa. Further possible functions of the signal processing unit 121 may be modulating and demodulating signals, coding and decoding signals, analog-to-digital and digital-to-analog converting of signals. In some embodiments, the signal processing unit may communicate with a control unit and/or electronic components, such as actuators 122a, 122b and/or sensors 122c, 122d, via a protocol. In some embodiments, an electronic component may be an electrical load. In some embodiments, the signal processing unit may communicate with a control unit and/or an electronic component without a protocol.

In some embodiments, the signal processing unit may be part of the interface of the pallet 118. For this purpose, the signal processing unit may be integrated into the interface of the pallet 118 or may be connected to the interface of the pallet for signal and/or energy transmission. For example, the interface of the pallet may be arranged on a bottom side of a pallet for establishing a separable connection with the transmission arrangement and in particular plug-in connections of the interface of the pallet as a connection between the interface of the pallet and electronic components may be arranged on an upper side of the pallet, with the various components of the interface of the pallet being connected to one another in a wired or contactless manner.

Sensors may be, for example, temperature, force, position or angle sensors. Actuators may be, for example, swing clamps, vices, zero point clamping systems, magnetic clamps, vacuum clamps, HYD jaw chucks, E jaw chucks. Some actuators may be equipped with sensors. In some embodiments, as is also apparent in FIG. 3, a sensor 122e may be arranged on the pallet on a clamping ring of the pallet on which the clamping cones 112 clamp the pallet. This sensor may be, for example, a strain gauge configured to detect the tension of the pallet due to the clamping cones 112 in a sensory manner so that, for example, defective clamping cones can be detected and thus damage due to missing or poor tensioning of the pallet 106 on the pallet receptacle 105 can be avoided.

In some versions, a signal processing unit may correspond to an IO link master according to the IEC 61131-9 standard. This may have the advantage that electronic components may be used even more flexibly in connection with a machine tool.

In some embodiments, a pallet may include an RFID sensor, a barcode and/or a QR code, and a machine tool may, for example, be configured to read data from RFID sensors, the barcode or the QR code via an RFID, a barcode or a QR code reader, respectively. The data may include, for example, a unique identification of a pallet, an assignment of a pallet to a group of pallets, information about a workpiece clamped on a pallet, information about electronic components, etc.

In some embodiments, the data may include values for speed limits, in particular for rotary machining of a workpiece clamped on the pallet. Corresponding values for speed limits may depend on the clamping devices, workpieces and/or electronic components attached to the pallet.

Pallets may, for example, be categorized into pallets with an interface for transmitting energy and/or signals and into pallets without an interface for transmitting energy and/or signals. A machine tool may, for example, be configured to dock the interface 113 of the second element when a pallet includes an interface 118 and, when a pallet does not include an interface 118, to omit a corresponding movement of the interface 113 of the second element and to possibly cover the interface 113 with a housing/cover in order to protect the interface 113 from dirt, etc.

Figure 4:
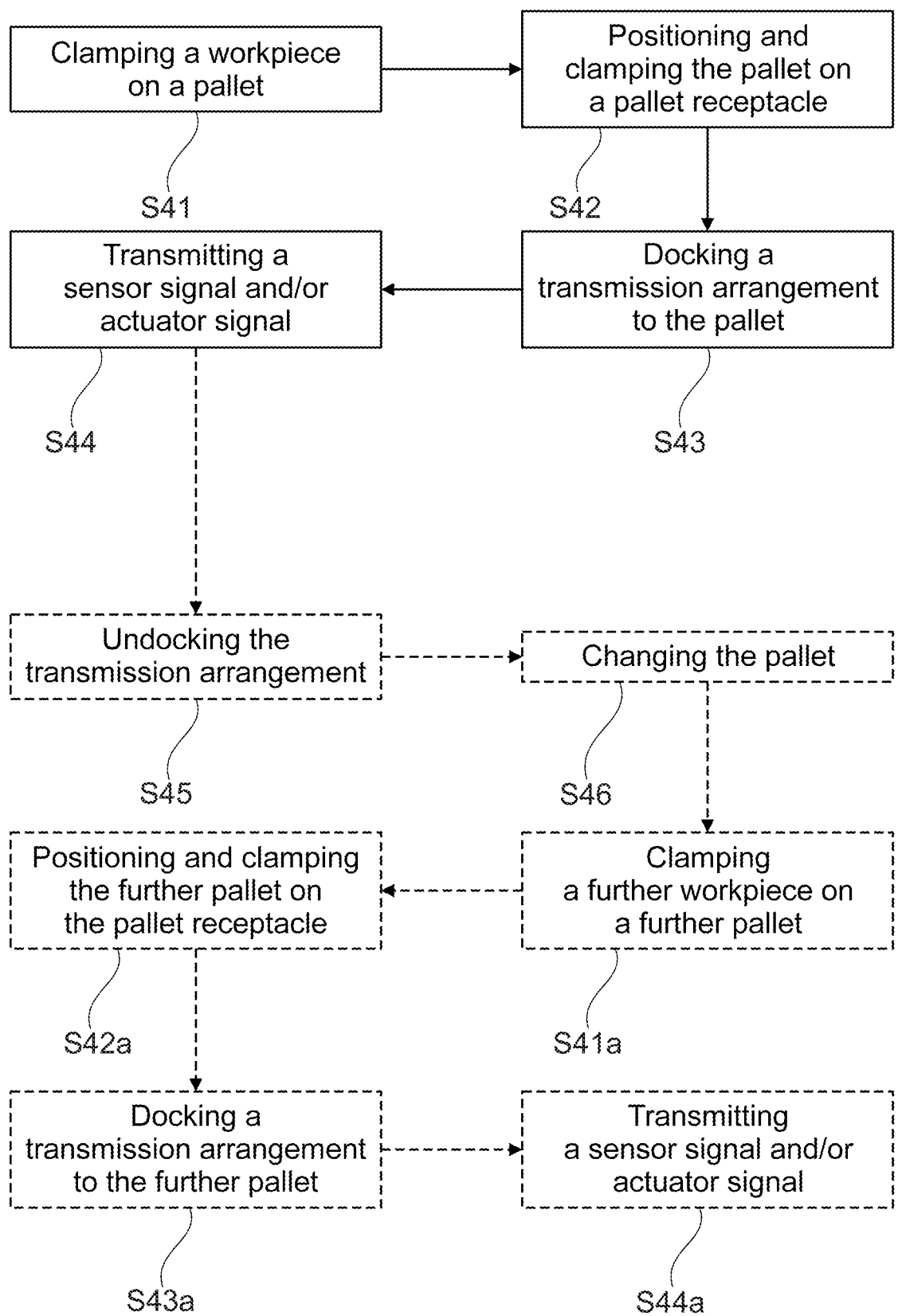
FIG. 4 schematically shows a process flow diagram of a method according to the invention.

FIG. 4 schematically shows a process flow diagram of a method according to the invention. The method may be used for various machine tools, in particular with a turning or milling center, for signal transmission between an electronic component and a machine tool. In the method schematically shown, it may be possible to combine individual steps, to execute them in parallel and/or to add new steps without changing the functionality of the method.

In a first step S41, a workpiece is clamped on a pallet, the pallet comprising an interface for signal and/or energy transmission. A pallet is preferably a workpiece carrier configured to be precisely clamped on a pallet receptacle of the machine tool in an automated manner. This means that setting up can be carried out outside the machine tool while another workpiece is being machined. The workpiece is preferably clamped on the pallet outside of a work area of a machine tool in order to enable parallelization between workpiece clamping and workpiece machining. As a result, work safety can also be increased since a machine user no longer needs to be present in the work area of the machine tool in order to clamp the workpiece. In order to be able to use a plurality of pallets on a machine tool, the machine tool may be equipped with a pallet store.

The interface of the pallet may comprise a contactless and/or a contact-based interface. Furthermore, the interface may be configured to transmit energy and/or signals between components such as sensors and actuators on the pallet and a control unit of a machine tool.

The clamping of the workpiece on the pallet may be automated or partially automated. For example, a machine may be configured to communicate with actuators, in particular a clamping device, and sensors via a transmission unit consisting of the interface of the pallet and an interface of the machine. The communication may include, for example, control signals or commands for controlling an actuator. In addition, the machine may comprise a positioning unit for positioning a workpiece relative to a clamping device arranged on the pallet.

In some embodiments, a control unit may be docked to the interface for clamping in order to control clamping jaws, for example by means of sensor signals and actuator signals. A workpiece clamping on a pallet may thus be automated or partially automated. In some versions, the workpiece may also be clamped manually on a pallet. For this purpose, actuators may be controlled manually and electronically in various embodiments.

In a further step S42, the pallet may be clamped on a machine tool table of the machine tool. The machine tool table may be rotatably mounted, for example for rotary machining of a workpiece or for positioning a workpiece. Positioning and clamping may be carried out, for example, by means of clamping cones.

In a further step S43, a transmission arrangement of the machine tool is docked to the interface of the pallet. This makes it possible to transmit control signals to actuators on a pallet from a control unit of the machine tool during workpiece machining. In addition, it is also possible to transmit sensor signals from sensors on a pallet to the control unit of the machine tool during workpiece machining. Signal transmission may also include bidirectional communication, such as sensor settings for a sensor.

The transmission arrangement may comprise a first element and a second element, as well as a transmission unit configured to transmit signals and/or energy between the first and second element, in order to enable a transmission of signals between a pallet on a pallet receptacle mounted rotatably relative to a carrier of the pallet receptacle and a control unit of the machine tool. Non-restrictive exemplary embodiments for a transmission arrangement are shown in FIGS. 1a-c and 2, as well as FIGS. 5a-5c.

In a step S44, a sensor signal and/or an actuator signal is transmitted via the docked transmission arrangement. Thereby, a workpiece or actuators such as clamping jaws, etc. can be monitored during workpiece machining and, if needed, actuators can be controlled via signals during workpiece machining. This allows for more intensive monitoring of workpiece machining, in particular with regard to the workpiece properties and the workpiece clamping. This may be used both to improve the precision during workpiece machining and to increase safety during workpiece machining. At the same time, the degree of automation can be increased since sensors and actuators on a pallet can be flexibly controlled by a control unit of the machine tool.

In particularly efficient embodiments, the method additionally includes steps S45, S46 and S41a-S44a.

In a step S45, the transfer arrangement is undocked and, in a step S46, the pallet is changed. Undocking the pallet before changing it can be particularly useful in case of a plug-in connection. In the case of a loose connection, for example by means of spring contacts, undocking before a pallet change may protect the spring contacts by preventing the spring contacts from bending due to shear forces. In some embodiments, the undocking may be carried out by removing a pallet from the machine tool table, in particular in case of contactless transmitters.

Steps S41a-S44a are analogous to steps S41-S44. In step S41a, a further workpiece is clamped on a further pallet, the further pallet likewise comprising an interface for signal transmission and/or energy transmission. Depending on the embodiment, the further pallet may also be the pallet on which the workpiece was clamped in step S41.

A relative position of the interface of the pallet from step S41, the relative position being relative to a clamping surface for clamping on the machine tool table, preferably coincides with the relative position of the interface of the pallet from step S41a.

In step S42a, the further pallet is positioned and clamped on the machine tool table and, in step S43a, the transmission arrangement is docked to the interface of the further pallet for transmission of energy and/or signals. Finally, in step S44a, at least one sensor signal, at least one actuator signal and/or energy is transmitted via the docked transmission arrangement.

This method has the advantage that, regardless of a clamping device, signals from sensors/actuators on a pallet can be exchanged with a control unit of the machine tool via the transmission device, in particular during rotary workpiece machining. This ensures low-interference transmission of data. In addition, a pallet change may be performed in a fully automated manner, in particular when a connection of electronic components on the pallet with a control unit of the machine tool is necessary/advantageous during workpiece machining.

Figure 5A:
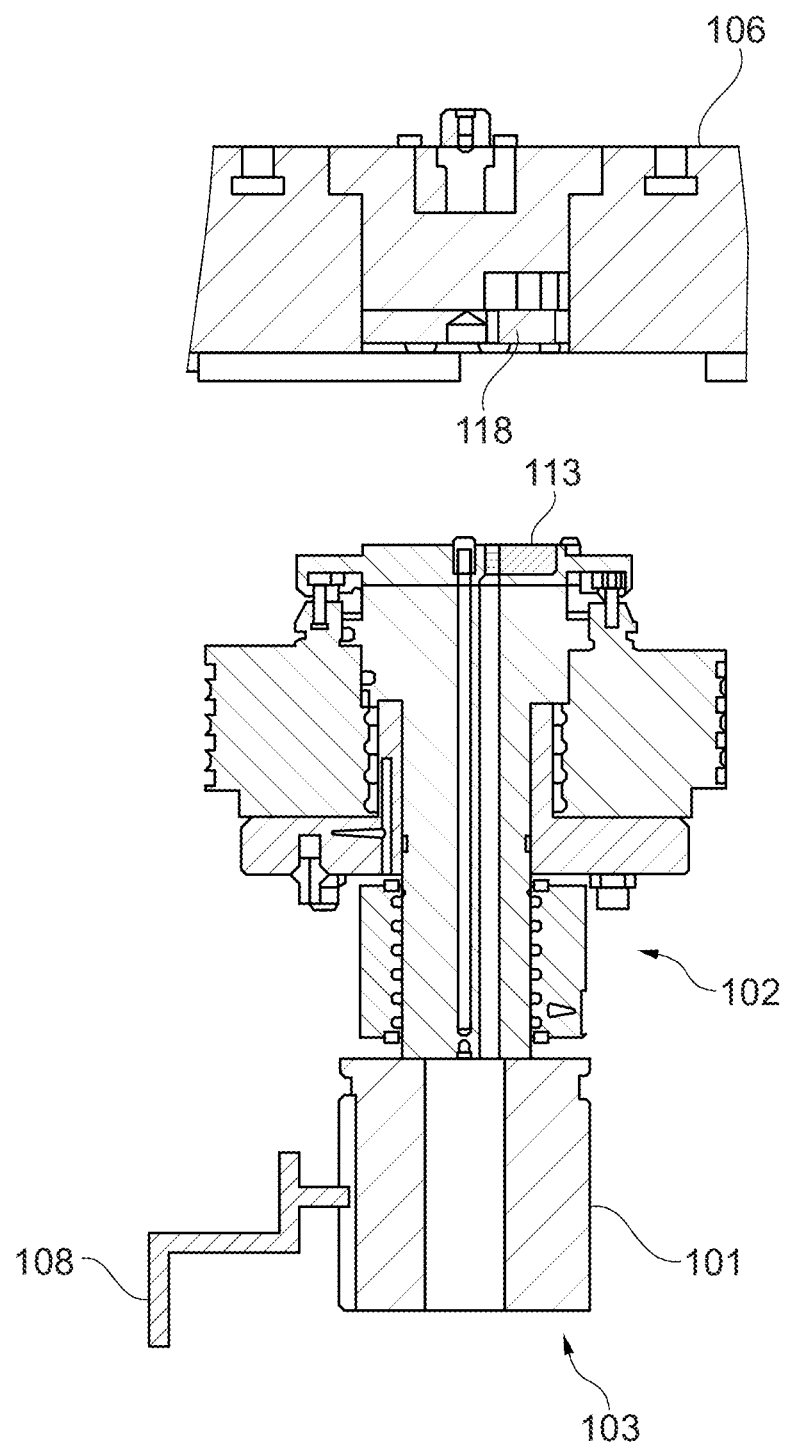
FIGS. 5a-5c schematically show, inter alia, a transfer arrangement according to an embodiment of the invention before positioning a pallet on a pallet receptacle, before docking the transfer arrangement on an interface of the pallet, or after docking the transfer arrangement on the interface of the pallet.
Figure 5B:
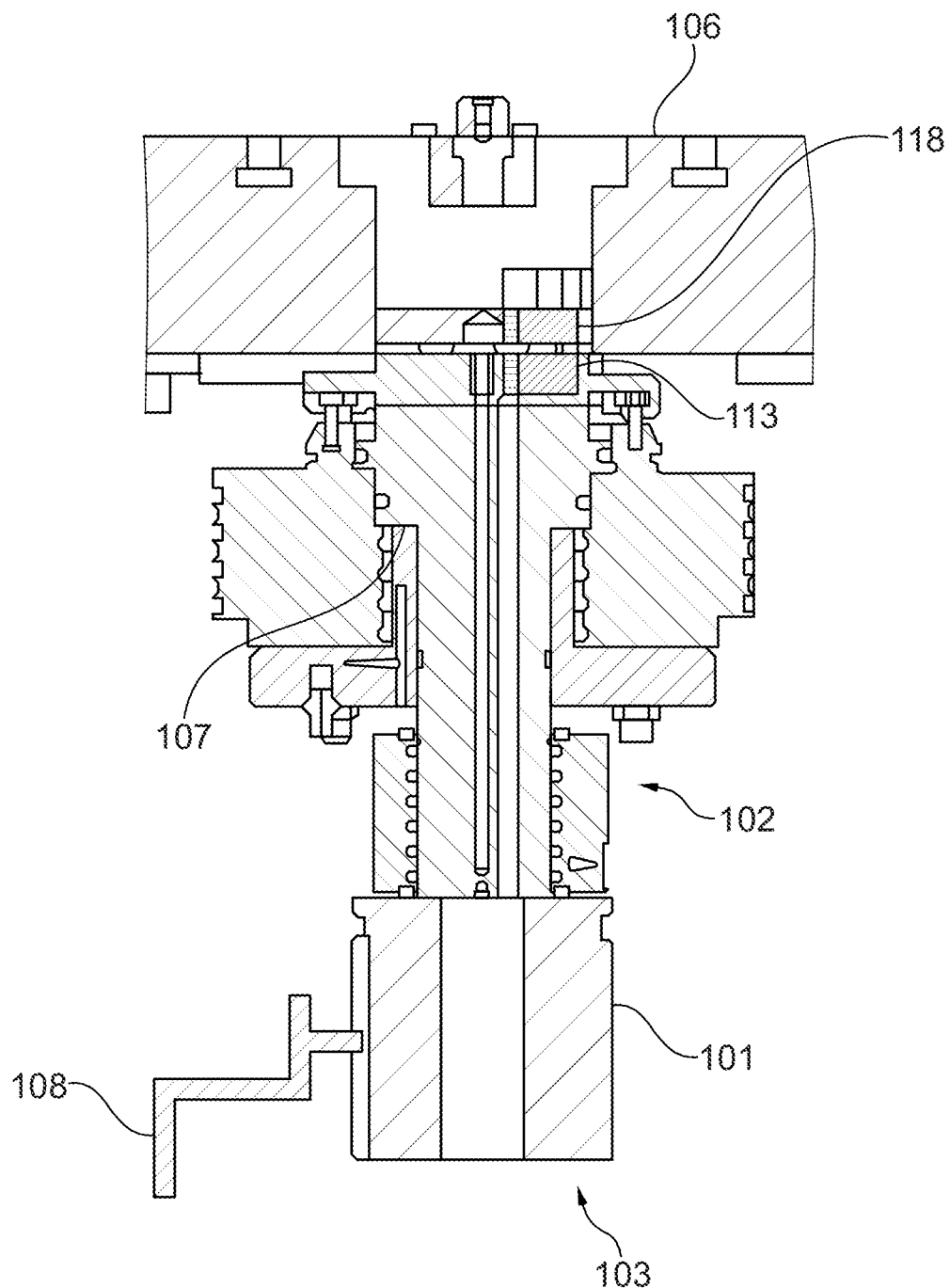
Figure 5C:
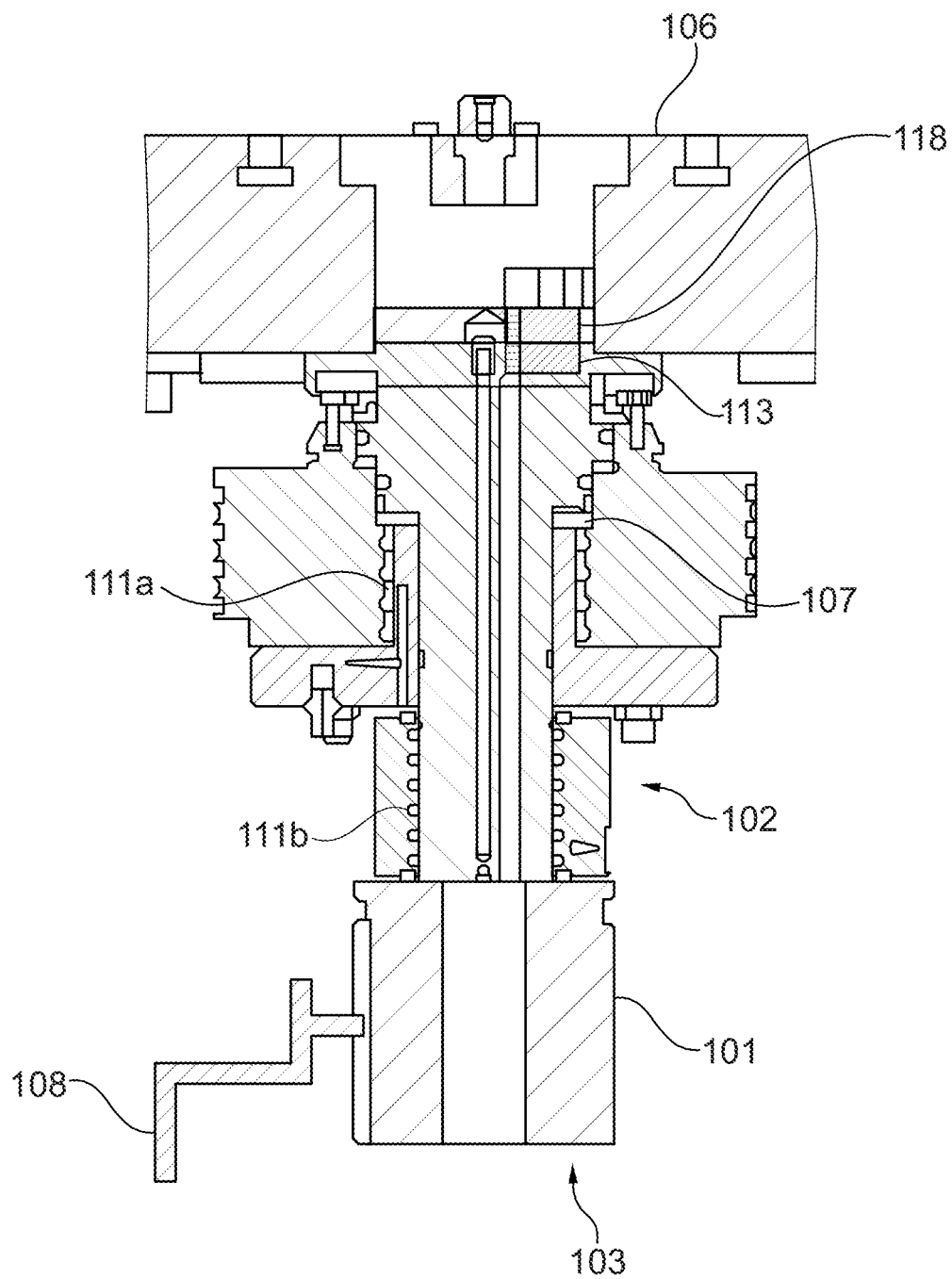

FIGS. 5a-5c schematically show, inter alia, a transfer arrangement according to an embodiment of the invention before positioning a pallet on a pallet receptacle, before docking the transfer arrangement on an interface of the pallet, or after docking the transfer arrangement on the interface of the pallet. When comparing FIGS. 5b and 5c, it is apparent that, in this embodiment, the first element 101, the second element 102 and the rotary leadthrough 111b are moved relative to the torque support 108, the rotary leadthrough 111a and the pallet 106 towards the pallet when the transmission arrangement is docked to the pallet. In contrast, when positioning and clamping the pallet on the pallet receptacle, only the pallet is moved in the direction of the transfer arrangement in this embodiment. This is apparent, in particular, when comparing FIGS. 5a and 5b. In this embodiment, the transmission arrangement is moved relative to the pallet receptacle 105 and docked to the pallet 106 by means of the hydraulic unit 107.

REFERENCE SYMBOLS 101 first element
102 second element
102a portion of the second element
103 first transmission unit
104 second transmission unit
105 pallet receptacle
106 pallet
107 hydraulic unit for performing a docking stroke
108 torque support
109 channel in a rotary leadthrough
110 bearing
111a, b rotary leadthroughs
112 clamping cones
113 interface of the second element
118 interface of the pallet
119 rotational axis
120 carrier of the pallet receptacle
121 signal processing unit
122a, b actuators
122c, d sensors
122e sensor for measuring a clamping force between the pallet and the pallet receptacle
123 connection between the first element and a control unit of the machine tool or a power supply
124 recess of the second element
125a-125c slip ring transmitters
126 contactless transmitter
127 area between two slip ring transmitters or a slip ring transmitter and a contactless transmitter

The invention claimed is:

1. A transmission arrangement for energy and/or signal transmission between a control unit of a machine tool and at least one electronic component, in particular for use in a machining center or a turning and/or milling center, comprising:
    a first (103) and a second (104) transmission unit,
    a first (101) and a second (102) element,
    wherein said second element (102) is mounted rotatably relative to said first element (101),
    wherein said first element (101) is connected to said control unit for signal and/or energy transmission,
    wherein said first transmission unit (103) is configured to transmit signals and/or energy between said first element (101) and said second element (102),
    wherein said second transmission unit (104) is configured to transmit signals and/or energy between said second element (102) and a pallet (106) detachably fastened to a pallet receptacle (105) of said machine tool,
    wherein said at least one electronic component is connected to said pallet for signal and/or energy transmission, and
    said first element (101) is supported in the radial direction by means of at least one torque support (108).

2. The transmission arrangement according to claim 1, wherein
    said at least one electronic component is fixedly or releasably connected to said pallet (106).

3. The transmission arrangement according to claim 1, wherein
    said first transmission unit (103) is configured to transmit at least one signal and/or energy in a contactless manner.

4. The transmission arrangement according to claim 1, wherein
    said first transmission unit (103) comprises a slip ring transmitter for energy transmission including an integrated inductive coupler for signal transmission.

5. The transmission arrangement according to claim 1, further comprising:
    at least one rotary leadthrough (111b) as a sealed passage between a hydraulic fluid supply, a gas supply or a vacuum supply and said second element (102) for gases and/or liquids.

6. The transmission arrangement according to claim 1, wherein
    said at least one electronic component is fixed to a machine tool table, to said pallet (106) and/or to said workpiece.

7. The transmission arrangement according to claim 1, wherein a signal processing unit (121) is arranged on, in or at a machine tool table, said pallet receptacle (105) and/or said pallet (106),
    wherein said signal processing unit is connected to said at least one electronic component for signal and/or energy transmission, and wherein said signal processing unit is connected to said transmission arrangement for signal and/or energy transmission.

8. The transmission arrangement according to claim 1, wherein an SDCI interface (121) ("single-drop digital communication interface for small sensors and actuators"), which conforms to the IEC 61131 standard, is connected to a pallet (106) or a machine tool table for signal and/or energy transmission, and
wherein signals and/or energy are transmitted between said at least one electronic component and said control unit of said machine tool via said SDCI interface and said transmission arrangement.

9. The transmission arrangement according to claim 1, wherein
at least the surface of a machine tool table or of said pallet receptacle (105) includes a recess for at least part of said transmission arrangement on a side directed towards said workpiece or on a side directed towards a pallet (106).

10. The transmission arrangement according to claim 1, wherein
said first transmission unit (103) includes, on the side of said first element (101), a body with a cylindrical recess, and
said first transmission unit (103) includes, on the side of said second element (102), a cylindrical body which is at least partially arranged in the cylindrical recess of said body with the cylindrical recess of said first transmission unit (103).

11. A transmission arrangement for energy and/or signal transmission between a control unit of a machine tool and at least one electronic component, in particular for use in a machining center or a turning and/or milling center, comprising:
a first (103) and a second (104) transmission unit,
a first (101) and a second (102) element,
wherein said second (102) element is mounted rotatably relative to said first element (101),
wherein said first element (101) is connected to said control unit for signal and/or energy transmission,
wherein said first transmission unit (103) is configured to transmit signals and/or energy between said first (101) and said second (102) element,
wherein said transmission arrangement is configured to establish a releasable connection of said second transmission unit (104) for energy and/or signal transmission between said second element (102) and at least one electronic component by means of a docking stroke of said transmission arrangement.

12. The transmission arrangement according to claim 11, wherein
said first element (101) is supported in the radial direction by means of at least one torque support (108).

13. The transmission arrangement according to claim 11, wherein
said second transmission unit (104) is configured to transmit at least one signal and/or energy in a contactless manner, in particular by means of an inductive coupler, and/or in a contact-based manner, in particular by means of a spring contact.

14. A transmission arrangement for energy and/or signal transmission between a control unit of a machine tool and at least one electronic component, in particular for use in a machining center or a turning and/or milling center, comprising:
a first (103) and a second (104) transmission unit,
a first (101) and a second (102) element,
wherein said second element (102) is mounted rotatably relative to said first element (101),
wherein said first element (101) is connected to said control unit for signal and/or energy transmission,
wherein said first transmission unit (103) is configured to transmit signals and/or energy between said first element (101) and said second element (102),
wherein said transmission arrangement is configured to establish a releasable connection of said second transmission unit (104) for energy and/or signal transmission between said second element (102) and a pallet (106) detachably fastened to a pallet receptacle (105) of said machine tool by means of a docking stroke of said transmission arrangement, and
wherein said at least one electronic component is connected to said pallet for signal and/or energy transmission.

15. A method for transmitting energy and/or at least one signal between a machine tool and at least one electronic component, said method comprising the steps of:
clamping a workpiece on a pallet comprising an interface for signal transmission and/or for energy transmission,
positioning and clamping said pallet on a pallet receptacle of said machine tool,
docking a transmission arrangement for the transmission of energy and/or signals to said interface of said pallet,
transmitting at least one sensor signal, at least one actuator signal and/or energy via the docked transmission arrangement,
undocking said transmission arrangement,
changing said pallet,
clamping a further workpiece on a further pallet comprising an interface for signal transmission and/or for energy transmission,
positioning and clamping said further pallet on said pallet receptacle of said machine tool,
docking said transmission arrangement for the transmission of energy and/or signals to said interface of said further pallet, and
transmitting at least one sensor signal, at least one actuator signal and/or energy via the docked transmission arrangement.

16. The method according to claim 15, wherein
the docking is carried out via a docking stroke of at least a part of said transmission arrangement directed towards said pallet so that contact between said transmission arrangement and said interface of said pallet is established.

17. A transmission arrangement for energy and/or signal transmission between a control unit of a machine tool and at least one electronic component, in particular for use in a machining center or a turning and/or milling center, comprising:
a first (103) and a second (104) transmission unit,
a first (101) and a second (102) element,
wherein said second element (102) is mounted rotatably relative to said first element (101),
wherein said first element (101) is connected to said control unit for signal and/or energy transmission,
wherein said first transmission unit (103) is configured to transmit signals and/or energy between said first element (101) and said second element (102),
wherein said second transmission unit (104) is configured to transmit signals and/or energy between said second element (102) and a pallet (106) detachably fastened to a pallet receptacle (105) of said machine tool, wherein said at least one electronic component is connected to said pallet for signal and/or energy transmission, and wherein said second transmission unit (104) is configured to transmit at least one signal and/or energy in a contactless manner, in particular by means of an inductive coupler, and/or in a contact-based manner, in particular by means of a spring contact.

18. The transmission arrangement according to claim 17, wherein a signal processing unit (121) is arranged on, in or at a machine tool table, said pallet receptacle (105) and/or said pallet (106), wherein said signal processing unit is connected to said at least one electronic component for signal and/or energy transmission, and wherein said signal processing unit is connected to said transmission arrangement for signal and/or energy transmission.

19. The transmission arrangement according to claim 17, wherein an SDCI interface (121) ("single-drop digital communication interface for small sensors and actuators"), which conforms to the IEC 61131 standard, is connected to a pallet (106) or a machine tool table for signal and/or energy transmission, and wherein signals and/or energy are transmitted between said at least one electronic component and said control unit of said machine tool via said SDCI interface and said transmission arrangement.

20. The transmission arrangement according to claim 17, wherein at least the surface of a machine tool table or of said pallet receptacle (105) includes a recess for at least part of said transmission arrangement on a side directed towards said workpiece or on a side directed towards a pallet (106).

21. The transmission arrangement according to claim 17, wherein said first transmission unit (103) includes, on the side of said first element (101), a body with a cylindrical recess, and said first transmission unit (103) includes, on the side of said second element (102), a cylindrical body which is at least partially arranged in the cylindrical recess of said body with the cylindrical recess of said first transmission unit (103).

22. A method for transmitting energy and/or at least one signal between a machine tool and at least one electronic component, said method comprising the steps of:

clamping a workpiece on a pallet comprising an interface for signal transmission and/or for energy transmission, positioning and clamping said pallet on a pallet receptacle of said machine tool, docking a transmission arrangement for the transmission of energy and/or signals to said interface of said pallet via a docking stroke of at least a part of said transmission arrangement directed towards said pallet so that contact between said transmission arrangement and said interface of said pallet is established, and transmitting at least one sensor signal, at least one actuator signal and/or energy via the docked transmission arrangement.

* * * * *